(12) United States Patent
Parisi et al.

(10) Patent No.: US 11,702,152 B2
(45) Date of Patent: Jul. 18, 2023

(54) ADJUSTMENT DEVICE FOR CONTROLLING THE AERODYNAMIC LOAD ON A MOTORCAR

(71) Applicant: AUTOMOBILI LAMBORGHINI S.P.A., Sant'Agata Bolognese (IT)

(72) Inventors: Riccardo Parisi, Sant'Agata Bolognese (IT); Ugo Riccio, Modena (IT); Antonio Torluccio, Imola (IT)

(73) Assignee: AUTOMOBILI LAMBORGHINI S.P.A., Sant'Agata Bolognese (IT)

( * ) Notice: Subject to any disclaimer, the term of this patent is extended or adjusted under 35 U.S.C. 154(b) by 236 days.

(21) Appl. No.: 17/280,470

(22) PCT Filed: Oct. 11, 2019

(86) PCT No.: PCT/IB2019/058679
§ 371 (c)(1),
(2) Date: Mar. 26, 2021

(87) PCT Pub. No.: WO2020/079545
PCT Pub. Date: Apr. 23, 2020

(65) Prior Publication Data
US 2022/0033008 A1    Feb. 3, 2022

(30) Foreign Application Priority Data

Oct. 18, 2018 (IT) .................. 102018000009561

(51) Int. Cl.
*B62D 35/02* (2006.01)
*B62D 37/02* (2006.01)
(52) U.S. Cl.
CPC ............. *B62D 35/02* (2013.01); *B62D 37/02* (2013.01)

(58) Field of Classification Search
CPC ........ B62D 35/00; B62D 35/02; B62D 37/02; B60K 11/08; Y02T 10/82; Y02T 10/88
See application file for complete search history.

(56) References Cited

U.S. PATENT DOCUMENTS

| 8,210,600 B1 * | 7/2012 | Verhee | B62D 35/005 |
| | | | 296/180.1 |
| 2017/0151984 A1 | 6/2017 | Bray et al. | |
| 2019/0291790 A1 * | 9/2019 | Riggs | B62D 37/02 |

FOREIGN PATENT DOCUMENTS

| DE | 102011056663 A1 | 6/2013 |
| DE | 102014111074 A1 | 2/2016 |
| DE | 102014118631 A1 * | 6/2016 |
| DE | 102016116458 A1 | 7/2017 |
| JP | H0390485 A | 4/1991 |
| JP | 2017013711 A | 1/2017 |
| JP | 2018020582 A | 2/2018 |

OTHER PUBLICATIONS

International Search Report and Written Opinion dated Jan. 16, 2020 from counterpart International Patent Application No. PCT/IB2019/058679.
Japanese Office Action dated Mar. 28, 2023 from counterpart Japanese Patent Application No. 2021-521165.

* cited by examiner

*Primary Examiner* — Lori Lyjak
(74) *Attorney, Agent, or Firm* — Shuttleworth & Ingersoll, PLC; Timothy J. Klima

(57) ABSTRACT

An adjustment device for controlling the aerodynamic load acting on a motorcar, includes an underbody diffuser.

13 Claims, 4 Drawing Sheets

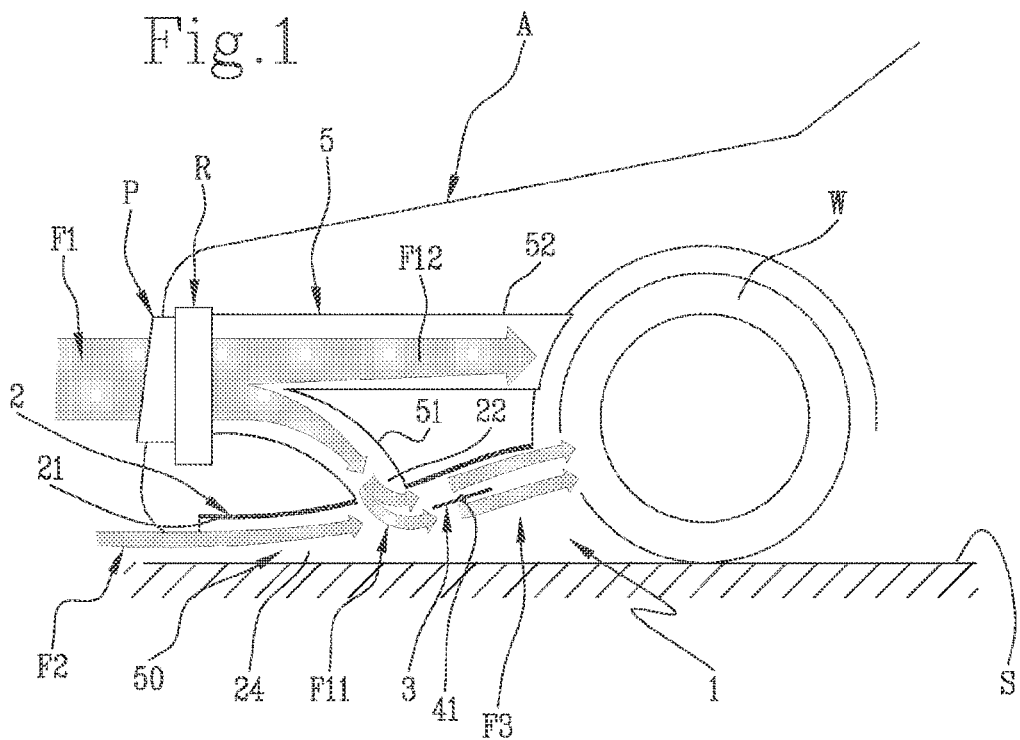
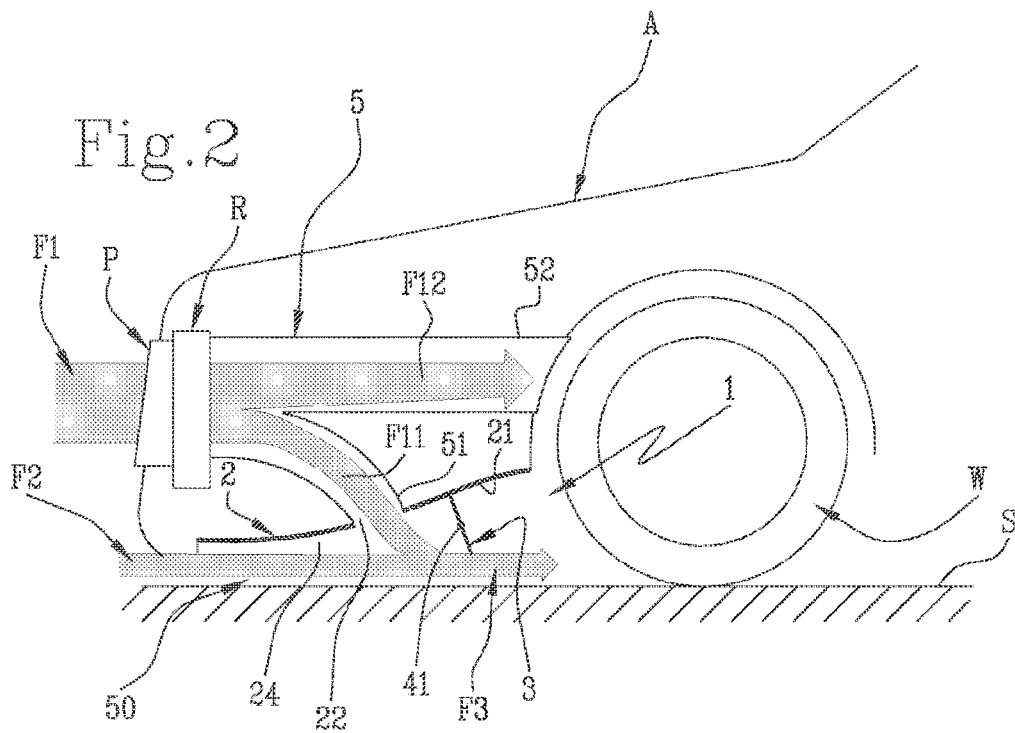

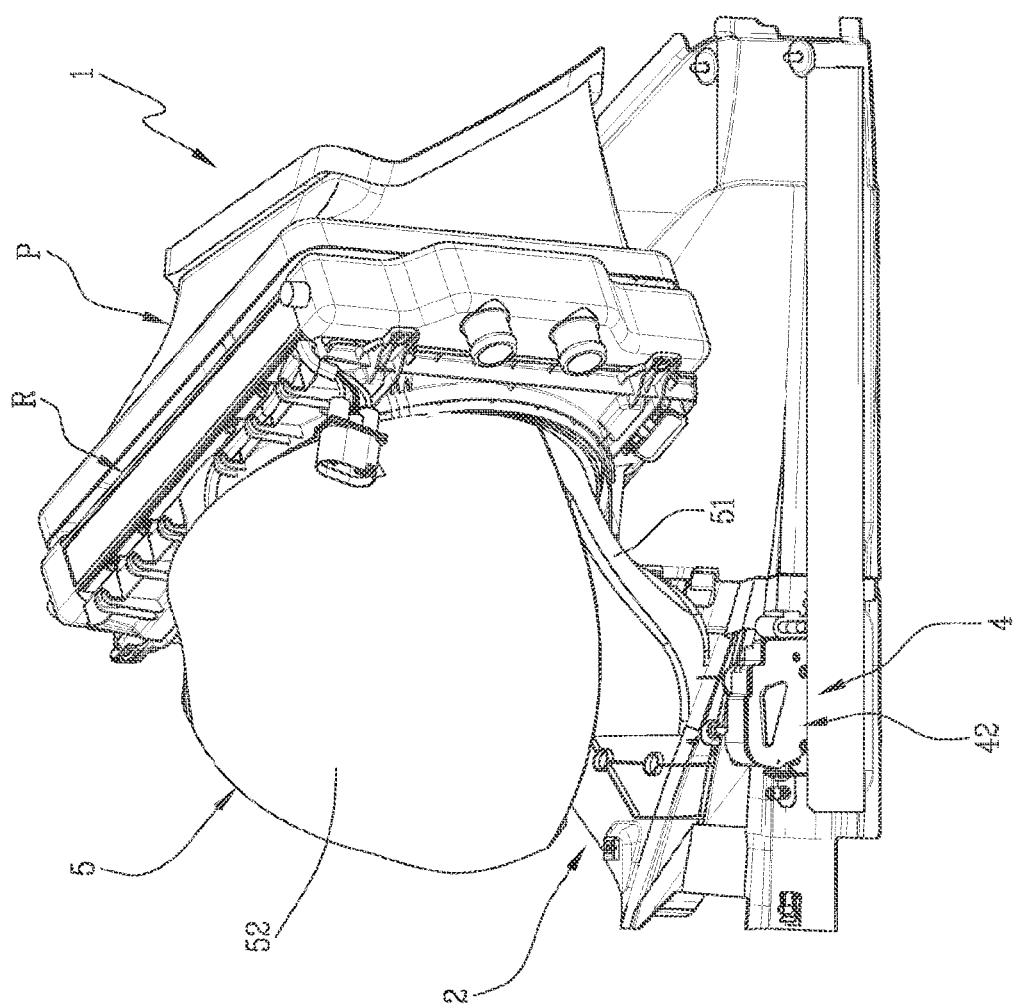

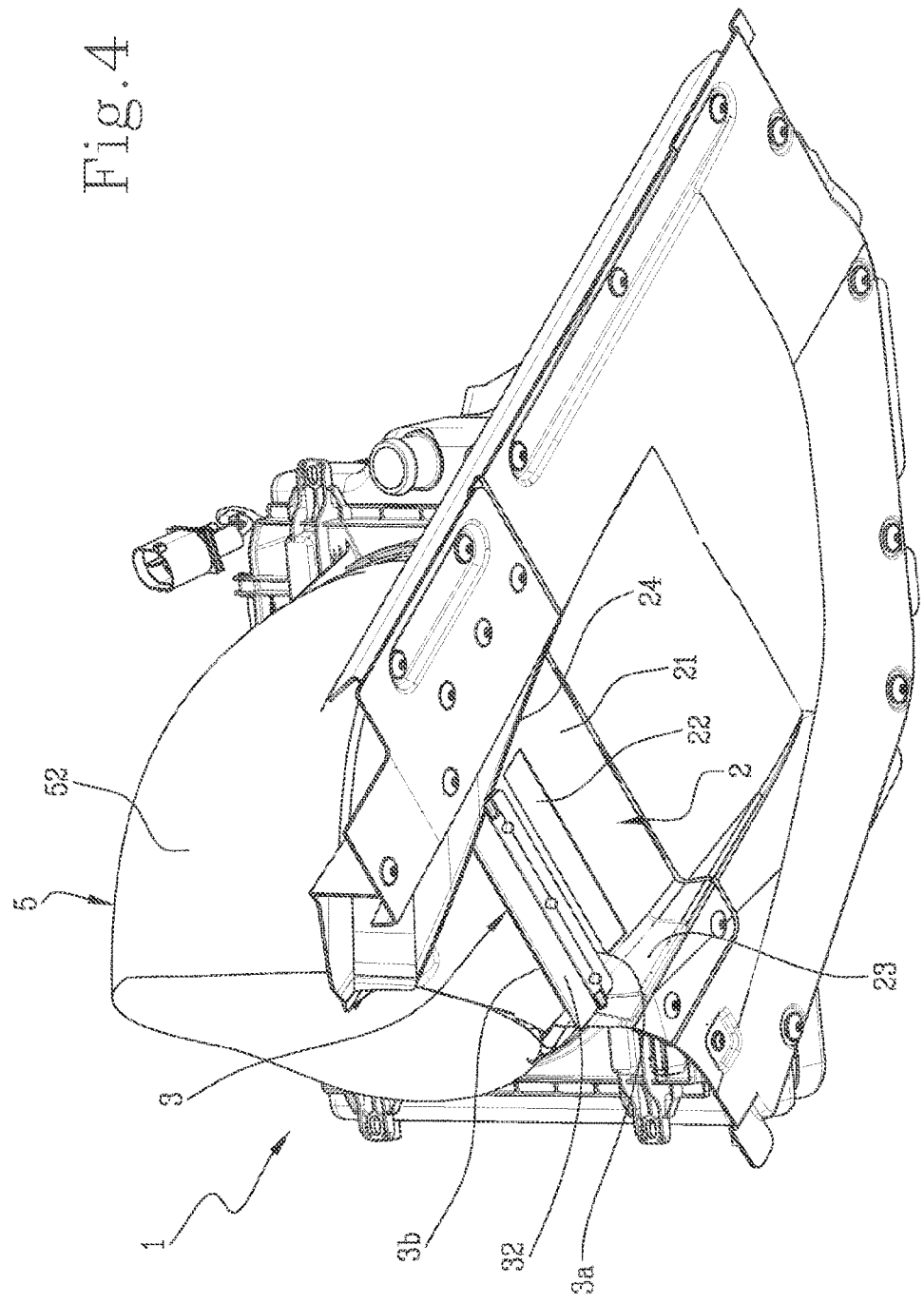

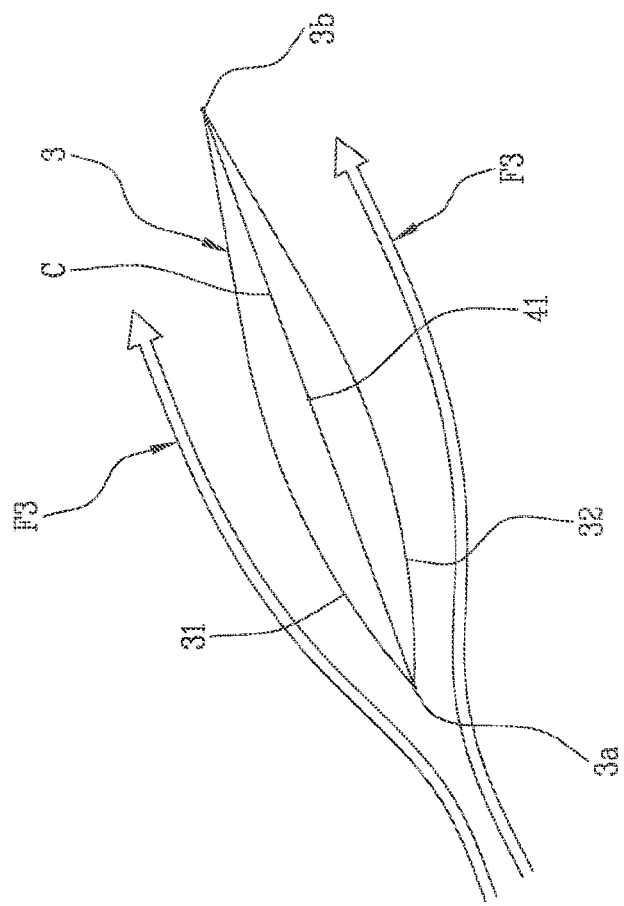

ADJUSTMENT DEVICE FOR CONTROLLING THE AERODYNAMIC LOAD ON A MOTORCAR

This application is the National Phase of International Application PCT/IB2019/058679 filed Oct. 11, 2019 which designated the U.S.

This application claims priority to Italian Patent Application No. 102018000009561 filed Oct. 18, 2018, which application is incorporated by reference herein.

TECHNICAL FIELD

This invention relates to an adjustment device suitable for adjusting an aerodynamic load which acts on a motorcar, by means of at least one underbody diffuser mounted on the motorcar itself, as well as a motorcar which comprises that adjustment device.

BACKGROUND ART

At present devices exist which allow the adjustment of an aerodynamic load acting on the motorcar and which make use of movable shutters which open and close to geometrically vary an outlet section made in an underbody of the motorcar, in such a way as to adjust the flow which is directed outward from that underbody through the outlet section. The shutters, or even a single shutter, may be moved by means of a movement system which comprises a motor suitable for moving the shutter.

The integration of the shutter in the underbody of the motorcar necessitates the presence of intermediate kinematic mechanisms, for connecting the shutter to the motor, which complicate the configuration of the components necessary for integrating the movement system near the shutter.

Moreover, the positioning of the shutter rather complicates the operations necessary for maintenance and/or if necessary substitution of the shutter and in general of the components of the adjustment device.

Another device is described for example in document DE102014111074 and illustrates a closed duct wherein the aerodynamic load is modified through a movable surface for increasing the pressure on the bumper and modifying the air flow into the duct located in a front zone of the vehicle.

AIM OF THE INVENTION

An adjustment device according to this description, and/or according to any one of the appended claims intended to protect the device, makes it possible to control an aerodynamic load acting on a motorcar, generated by means of at least one underbody diffuser, reducing the mechanical complexity of the device compared with the prior art, and obtaining important variations in that load.

An adjustment device according to this description, and/or according to any one of the appended claims intended to protect the device, makes it possible to control that aerodynamic load, simplifying, compared with the prior art, the operations for maintenance and substitution of the components of the device.

Control of the aerodynamic load, which the device makes possible, may even occur, if necessary, in response to user input, or fully automatically, based on the value of one or more kinematic parameters characterising the movement of the vehicle.

A motorcar according to this description comprises an adjustment device according to this description.

The characteristics of an adjustment device and of a motorcar according to this description will be clarified by the following appended description relative to respective example embodiments of that adjustment device and motorcar.

BRIEF DESCRIPTION OF THE DRAWINGS

The following detailed description refers to the accompanying drawings, in which:

FIG. 1 is a side diagram explaining the operation of a possible example embodiment of an adjustment device according to this description, while the device adopts a first operating condition of the device;

FIG. 2 is a side diagram explaining the operation of that embodiment of the adjustment device, while the device adopts a second operating condition of the device;

FIG. 3 is a perspective view from above of that possible embodiment;

FIG. 4 is a perspective view from below of that possible embodiment, while the device adopts that first operating condition of the device;

FIG. 5 schematically illustrates the way in which an aerodynamic element of that embodiment operates, while that device adopts the first operating condition.

DETAILED DESCRIPTION OF PREFERRED EMBODIMENTS OF THE INVENTION

In FIGS. 3 and 4, the number 1 indicates a possible example embodiment of an adjustment device according to this description. Hereinafter, device means that example embodiment.

FIG. 1 is a schematic side view, illustrating the operation of the adjustment device 1, while the device 1 adopts a first operating condition of the device 1.

FIG. 2 is a schematic side view, illustrating the operation of the adjustment device 1, while the device 1 adopts a second operating condition of the device 1.

The adjustment device 1 is configured to adjust the aerodynamic load acting on a motorcar A. In the figures, the device 1 is shown as part of the motorcar A. Therefore, the first operating condition and second operating condition may also be considered as a first operating condition of the motorcar A and a second operating condition of the motorcar A, respectively.

That first operating condition and second operating condition of the motorcar are considered to be operating situations during a normal forward motion of the motorcar A.

That aerodynamic load is considered to be positive if acting towards the ground surface S, during that normal forward motion of the motorcar A on the ground surface S itself. Normal forward motion includes both the case in which the motion of the motorcar occurs along a straight trajectory and the case in which the motion of the motorcar occurs along any curvilinear trajectory. The drag is considered positive if it is directed in the opposite direction to the forward motion.

Each of the first operating condition and the second operating condition of the device 1 and/or of the motorcar A may therefore occur during any normal forward motion of the motorcar A.

As will be clarified below, the first operating condition corresponds to a maximum aerodynamic load configuration for the motorcar A, whilst the second operating condition corresponds to a minimum aerodynamic load configuration for the motorcar A considering the device 1.

The device 1 comprises an underbody aerodynamic diffuser 2.

The diffuser 2 comprises an aerodynamic surface 21 facing or turned towards the ground surface S.

In use, the aerodynamic surface 21 at least partly delimits the top of a diffusion duct 50 the bottom of which is delimited by the ground surface S.

The diffuser 2 operates, by means of the aerodynamic surface 21, to generate the above-mentioned aerodynamic load. In particular, the diffuser 2 is configured in such a way that, both in that first operating condition and in that second operating condition, the diffusion duct 50 is defined between the aerodynamic surface 21 and the ground surface S.

The diffusion duct 50 is substantially confined between the aerodynamic surface 21 and the ground surface.

The diffuser 2 comprises an opening 22. The opening 22 is made through the aerodynamic surface 21. That opening 22 allows the diffuser 2 to take in at least one part of a first air inflow F1. That first air inflow F1 is received by an air inlet P of the motorcar A. The first inflow F1 is produced by the forward motion of the motorcar A and, preferably, passes through a radiator R of the motorcar.

In use, the opening 22 is located downstream of the radiator R considering a forward direction of motion of the motorcar A.

The part of flow which is taken in through the opening 22 therefore becomes an internal flow inside the diffuser 2. That internal flow is labelled F3 in FIGS. 1 and 2. That internal flow F3 flows in the above-mentioned diffusion duct 50.

The first inflow F1 received by the air inlet P is indicated in FIGS. 1 and 2.

The adjustment device 1 comprises a pipe 5 for conveying the flow. The pipe 5 is preferably configured to divide the inflow F1 into a first share or first part F11 and into a second share or second part F12. The first share F11 of the first flow F1 corresponds to the above-mentioned part of the first flow F1 which is taken in by the diffuser 2 and conveyed towards the diffusion duct 50. The second share F12 of the first flow F1 is directed, for example, towards a wheel W of the motorcar A, without passing through the diffuser 2. Therefore, the first share F11 of the first inflow F11 may be defined the "flow taken in". Therefore, the pipe 5 is configured in such a way that the first share F11 is the flow taken in by the diffuser 2 and the second share F12 is directed towards the wheel W without passing through the diffuser 2.

The pipe 5 comprises a first branch 51 and a second branch 52. The first branch 51 opens and/or leads into the diffuser 2 by means of and/or through the opening 22, in such a way as to contain and allow flowing of the flow taken in F11. The second branch 52 opens and/or leads into the wheel W compartment, in such a way as to contain and allow flowing of the second share F12 of the first inflow F1.

As illustrated for example, the second branch 52 has an inlet and an outlet, corresponding to the opening 22, leading into the diffusion duct 50.

As can be seen in FIGS. 1 and 2, the flow taken in F11 combines with a second air inflow F2. That second inflow enters directly, without passing through the air inlet P, between the underbody of the motorcar A and the ground surface S, that is to say, in the diffusion duct 50, produced by the above-mentioned forward motion. The flow taken in F11 and the second inflow F2 combine in the diffuser 2 in such a way as to cause the internal flow F3. That internal flow F3 therefore indicates the flow situated in the diffuser 2 and downstream of the opening 22, so that the internal flow F3 may be considered to be substantially comprising both the first share F11 of the first inflow F1, or the flow taken in F11, and the second inflow F2. That flow taken in F11 and that second inflow F2 are combined downstream of the opening 22 to cause the internal flow F3.

The internal flow F3 flows between the aerodynamic surface 21 and the ground surface S. The internal flow F3 flows in the above-mentioned diffusion duct 50 and in that sense is indicated as "internal".

From an aerodynamic viewpoint, the aerodynamic surface 21 is shaped in such a way that the diffuser 2 can exert, by means of that aerodynamic surface 21, a diffusing effect on that internal flow F3 which flows in the diffusion duct. That diffusing effect influences that aerodynamic load.

The device 1 comprises an aerodynamic element 3 movable between a first position, illustrated for example in FIGS. 1 and 4, and a second position, illustrated for example in FIG. 2.

The device 1 comprises a movement system 4 for moving the aerodynamic element 3.

The device 1 is configured in such a way that the aerodynamic element 3 can adopt at least the first position relative to the diffuser 2 and/or relative to the aerodynamic surface 21. The device 1 is configured in such a way that the aerodynamic element 3 can adopt at least the second position relative to the diffuser 2 and/or relative to the aerodynamic surface 21. In FIGS. 1 and 4 the aerodynamic element 3 is adopting that first position. In FIG. 2 the aerodynamic element 3 is adopting that second position.

The device 1 is configured in such a way that the aerodynamic element 3 can adopt at least a third position, not illustrated, relative to the diffuser 2 and/or relative to the aerodynamic surface 21.

The third position is intermediate between the first position and the second position.

If the aerodynamic element 3 adopts the first position, the device 1 adopts the first operating condition, that is to say, of maximum aerodynamic load. If the aerodynamic element 3 adopts the second position, the device 1 adopts the second operating condition, that is to say, of minimum aerodynamic load.

If the aerodynamic element 3 adopts the third position, the device 1 adopts an operating condition intermediate between the first and the second operating condition.

According to another aspect, if the aerodynamic element 3 adopts the first position, the flow taken in F11 is maximised and, consequently, the inflow F1 entering the air inlet P is increased.

Considering that, as indicated, the opening 22 is preferably downstream of the radiator R, which remains interposed between the air inlet P and the opening 22, with the aerodynamic element 3 at the first position the inflow F1 which affects the radiator itself is maximised.

The first operating condition corresponds to that first position of the aerodynamic element 3 and the second operating condition corresponds to that second position of the aerodynamic element 3.

The movement system 4 is configured to operatively keep, and therefore during that forward motion, that aerodynamic element 3 at that first position.

The movement system 4 is configured to operatively keep, and therefore during that forward motion, that aerodynamic element 3 at that second position.

The movement system 4 is configured to operatively keep, and therefore during that forward motion, that aerodynamic element 3 at that third position.

The movement system 4 is configured to cause the aerodynamic element 3 to move between the first position and the second position, and therefore from the first position to the second position or vice versa, also preferably passing through the third operating position. Therefore, the movement system 4 is configured to cause the passage of that device 1 and/or of that motorcar from the first operating condition to the second operating condition or vice versa.

The device 1 is configured in such a way that, during the forward motion of the motorcar and while the aerodynamic element 3 adopts the first position, the aerodynamic element 3 is immersed in the internal flow F3.

The device 1 is configured in such a way that, during the forward motion of the motorcar and if the aerodynamic element 3 adopts the first position, the aerodynamic element 3 allows the internal flow F3 to follow the aerodynamic profile of the aerodynamic surface 21, in such a way as to generate a first aerodynamic load acting on the motorcar A. In other words, during that forward motion, when the aerodynamic element 3 adopts the first position, the aerodynamic element 3 allows the internal flow F3 to follow the aerodynamic profile of the aerodynamic surface 21, in such a way as to generate a first aerodynamic load acting on the motorcar A.

The device 1 is configured in such a way that, during that forward motion of the motorcar and if the aerodynamic element 3 adopts the second position, the aerodynamic element 3 acts at least partly as a barrier against the internal flow F3, moving the internal flow away and/or keeping the internal flow F3 away from the aerodynamic surface 21, in such a way as to generate a second aerodynamic load acting on the motorcar A. The device 1 is configured in such a way that the second aerodynamic load is smaller than the first aerodynamic load.

In other words, during that forward motion, when the aerodynamic element 3 adopts the second position, the aerodynamic element 3 moves the internal flow away and/or keeps the internal flow F3 away from the aerodynamic surface 21, so that the second aerodynamic load is smaller than the first aerodynamic load.

The device 1 is configured in such a way that, during that forward motion of the motorcar if the aerodynamic element 3 adopts the third position, the aerodynamic element 3 acts at least partly as a barrier against the internal flow F3, moving the internal flow away and/or keeping the internal flow F3 away from the aerodynamic surface 21, in such a way as to generate a third aerodynamic load acting on the motorcar A which is intermediate between the first and second aerodynamic loads. The device 1 is configured in such a way that the third aerodynamic load is intermediate between the first and second aerodynamic load.

In other words, during that forward motion, when the aerodynamic element 3 adopts the third position, the aerodynamic element 3 moves the internal flow away and/or keeps the internal flow F3 away from the aerodynamic surface 21, so that the third aerodynamic load is intermediate between the first aerodynamic load and the second aerodynamic load.

From another viewpoint, during that forward motion, when the aerodynamic element 3 adopts the second position, the aerodynamic element 3 acts both on the flow taken in F11 and on the second inflow F2, so that the internal flow F3, which results from the combination of the flow taken in F11 and the second inflow F2, is moved away and/or kept away from the aerodynamic surface 21, in such a way that the second aerodynamic load is less than the first aerodynamic load.

From another viewpoint, the device 1 is configured in such a way that, when the aerodynamic element 3 adopts the first or the third position, the aerodynamic element 3 occludes that diffusion duct to a lesser degree than when it adopts that second position.

From another viewpoint, the degree of occlusion of that diffusion duct, the degree of occlusion being caused by that aerodynamic element 3, is smaller at the first position and at the third position than it is at the second position.

The device 1 is configured in such a way that, both when the aerodynamic element 3 adopts those first and third positions and when it adopts that second position, the aerodynamic element 3 is located and/or situated, along that diffusion duct 50 and in the direction of that internal flow F3, downstream of that opening 22.

When it adopts the second position, the aerodynamic element 3 has at least two main effects: it increases the pressure on the aerodynamic surface 21, thereby reducing the quantity of flow taken in F11 through the opening 22, and secondly, it moves both the flow taken in F11 and the second inflow F2 away from the aerodynamic surface 21. In that way, when the device adopts the second operating condition, a second aerodynamic load which is less than the above-mentioned first aerodynamic load is generated on the motorcar A.

That substantially means that the aerodynamic element 3, when it adopts the second position, tends to move the internal flow F3, which results from the combination of the flow taken in F11 and the second inflow F2, away relative to and/or from the aerodynamic surface 21. That moving away effect causes the internal flow F3 to not follow the aerodynamic surface 21, to which the function of diffusion of the internal flow F3 is assigned. Therefore, that second aerodynamic load, which is generated and acts on the motorcar A when the aerodynamic element 3 adopts the second position, is smaller than the first aerodynamic load. From another viewpoint the diffusing effect that the diffuser 2 exerts on the internal flow F3, is smaller when the aerodynamic element 3 adopts the second position than when the aerodynamic element 3 adopts the first position. That is because, when the aerodynamic element 3 adopts the second position, the internal flow F3 is kept away from the aerodynamic surface 21 and therefore does not follow the aerodynamic profile of the aerodynamic surface 21. In contrast, when the aerodynamic element 3 adopts the first position, the internal flow F3 is practically free to follow the aerodynamic profile of the aerodynamic surface 21, causing a greater diffusing effect by the diffuser 2 on the internal flow F3, and therefore causing the first aerodynamic load to be greater than the second aerodynamic load.

According to another aspect, the opening 22 is preferably located downstream of the radiator R, considering a forward direction of motion of the motorcar A.

In that way, through the opening 22 the first share of the inflow F1 received by the air inlet P is taken in, defining the flow taken in F11.

When the aerodynamic element 3 is at the second position, the quantity of flow taken in F11 decreases to almost zero.

That reduction in the flow rate of the flow taken in F11 results in a reduction in the flow rate through the radiator R in such a way as to reduce the drag of the motorcar A.

In other words, the aerodynamic element 3, acting downstream of the radiator R, alters the inflow F1 through the air inlet P with consequent improvement in the drag (when the aerodynamic element 3 is at the second position).

In brief, the device 1 is configured in such a way that the diffusing effect exerted by the diffuser 2 on the internal flow F3 is greater when the aerodynamic element 3 adopts the first position or the third position than when it adopts the second position, so that the first aerodynamic load and the third aerodynamic load are greater than the second aerodynamic load.

Moreover, since the first position and the third position of the aerodynamic element 3 cause a greater diffusing effect of the diffuser 2 on the internal flow F3, compared with the second position, the taking in effect of the diffuser 2 on the first inflow F1 is greater when the aerodynamic element 3 adopts the first position or the third position than when it adopts the second position. Therefore, the first position and the third position of the aerodynamic element 3 cause, compared with the second position, both a greater diffusing effect of the diffuser 2 on the internal flow F3 and a greater taking in effect of the diffuser 2 on the first inflow F1. Therefore, when the aerodynamic element 3 adopts the first position or the third position, there is an increase in the share F11 of the first inflow F1 which, once it has entered the diffuser 2, causes the internal flow F3.

Moreover, when the aerodynamic element 3 adopts the second position, moving the flow away from the aerodynamic surface 21, the internal flow F3 has a direction such that it avoids those mechanical components of the suspension which would be a source of drag. Therefore, when the aerodynamic element 3 adopts the second position, the drag decreases, compared with when it adopts the first position, which is an advantage in terms of the motorcar maximum velocity and reduction in consumption. Therefore, the second position of the aerodynamic element 3 causes a smaller drag on the motorcar, where drag means the part of aerodynamic force acting in the opposite direction to the forward motion and deriving from the first inflow F1 and from the second inflow F2.

FIG. 5 shows a possible embodiment of the aerodynamic element 3. In that example the aerodynamic element has the shape of an aerodynamic flap, and therefore of a wing.

The aerodynamic element 3 has a first external surface 31. The aerodynamic element 3 has a second external surface 32 opposite to the first external surface 31. Each of the first external surface 31 and second external surface 32 extends from the leading edge 3a to the trailing edge 3b of the aerodynamic element 3. The first external surface 31 is the back side of the flap and the second external surface 32 is the underside of the flap.

The adjustment device 1 is configured in such a way that, in that first position of the aerodynamic element 3, the aerodynamic element 3 causes the internal flow F3 to follow the profile of the aerodynamic surface 21 of the diffuser 2, both by contact of the internal flow F3 with the first external surface 31, and by contact of the internal flow F3 with the second external surface 32, for example as shown in FIG. 5.

The movement system 4 comprises a shaft 41. The aerodynamic element is mounted on the shaft 41, so that the aerodynamic element 3 rotates as one with the shaft 41 about the axis of the shaft 41. The shaft 41 is positioned, along that diffusion duct and in the direction of that internal flow F3, so that the aerodynamic element 3, both in that first position and third position and in that second position, is situated downstream of that opening 22.

The movement system 4 comprises an actuator or motor 42. The motor 42 acts on the shaft 41 to cause the rotation. In that way, the above-mentioned movement of the aerodynamic element 3 between the above-mentioned first position and second position, is a rotational movement about the axis of the shaft 41. The first position, second position and third position of the aerodynamic element 3 differ from each other in the orientation of the aerodynamic element 3 about the axis of the shaft 41 and relative to the diffuser 2 and/or relative to the aerodynamic surface 21. Therefore, that first position could also be defined as the first orientation of the aerodynamic element 3 relative to the aerodynamic surface 21 and about the axis of the shaft 41, that second position could also be defined as the second orientation of the aerodynamic element 3 relative to the aerodynamic surface 21 and about the axis of the shaft 41 and that third position could also be defined as the third orientation of the aerodynamic element 3 relative to the aerodynamic surface 21 and about the axis of the shaft 41.

In particular, the first and the third orientation of the aerodynamic element 3 cause, compared with the second orientation of the aerodynamic element 3, a greater diffusing effect of the diffuser 2 on the internal flow F3. For this reason, the first and the third aerodynamic load are greater than the second aerodynamic load. The first and the third orientation of the aerodynamic element 3, compared with the second orientation of the aerodynamic element 3, also cause an increase in drag due to the greater flow which is directed towards the suspensions of the wheel W.

In use, when the aerodynamic element 3 adopts the second position or second orientation, the diffuser 2 is as if it were disabled or at least partly disabled. Therefore, the first and the third aerodynamic load are greater than the second aerodynamic load.

In FIG. 5 the shaft 41 is schematically illustrated as if coinciding with its axis.

The shaft 41 is positioned in such a way as to be transverse and/or orthogonal to the aerodynamic chord c of the aerodynamic element 3, and situated between the leading edge 3a and the trailing edge 3b of the aerodynamic element 3, as can be seen in FIG. 5.

The diffuser 2 comprises a first lateral surface 23. The diffuser 2 comprises a second lateral surface 24. The first lateral surface 23 extends transversely to the aerodynamic surface 21. The second lateral surface 24 extends transversely to the aerodynamic surface 21. The first lateral surface 23 and the second lateral surface 24 laterally delimit that internal flow F3. The shaft 41 is supported by the first lateral surface 23 and by the second lateral surface 24.

The first lateral surface 23 and the second lateral surface 24 laterally delimit the above-mentioned diffusion duct 50. The aerodynamic surface 21 delimits the top of the above-mentioned diffusion duct 50.

The first lateral surface 23, the second lateral surface 24 and the aerodynamic surface 21 between them delimit the diffusion duct 50.

The shaft 41 is situated inside the diffusion duct 50. The aerodynamic element 3, at the first, second and third position is preferably situated inside the duct.

In a preferred embodiment, considering the aerodynamic element 3 as a flap, the energy necessary to make the adjustment device 1 pass from the second operating condition, which corresponds to the second position or orientation of the flap 3, to the first operating condition, which corresponds to the first position or orientation of the flap 3, is reduced since the optimal position of the axis of rotation of the flap 3, and therefore of the axis of the shaft 41 has been selected, based on fluid dynamic simulations and tests on prototypes. The axis of rotation is a neutral axis which at the second position also favours maintaining it with minimum energy expenditure, the external surface of the flap 3 being exposed to greater pressure compared with all of the other stable and/or transitory conditions of the flap 3. Moreover, the fact that the flap 3 is supported by the shaft 41, reduces the structural complexity of the mechanical components necessary for integrating the movement system 4 in the diffuser 2. The shaft 41, which is the element with which the motor 42 must connect in order to move the flap 3, is in fact positioned in such a way as to make the connection with the motor 42 simpler.

The motor 42 may act directly about a motor-driven axis which coincides with the axis of the shaft 42, without transmission passages transverse to that axis. That greatly simplifies the configuration of the adjustment device 1.

The adjustment device 1 comprises a structure. That structure shall be considered as defining the aerodynamic surface 21. The structure may be built into and/or mounted on an underbody of the motorcar A so that the aerodynamic surface 21 defines a portion of the external underbody surface of the motorcar A.

That structure may be considered as also defining the lateral surfaces 23 and 24, in which case those lateral surfaces also contribute to defining that portion of the underbody surface.

The adjustment device 1 could also comprise the air inlet P itself.

The adjustment device 1 could also comprise the radiator R. The radiator R is interposed between the air inlet P and the opening 22, so that the above-mentioned first share F11 of the inflow F1 received by the air inlet P, before entering and being taken in by the diffuser 2, passes through the radiator R.

Therefore, at the first position of the aerodynamic element 3, the first share F11 being greater than when the aerodynamic element 3 is at the second position, the cooling effect of the radiator R is greater.

A possible motorcar A according to this description comprises the adjustment device 1. The aerodynamic surface 21 of the diffuser 2 defines a portion of the underbody surface of the motorcar A.

The adjustment device 1 is preferably situated in front of a preferably front wheel W of the motorcar A.

Each of the above-mentioned characteristics may in any case be combined with any group of one or more of the other above-mentioned characteristics, to create one or more further embodiments of a device according to this description.

The invention claimed is:

1. An adjustment device for controlling an aerodynamic load on a motorcar, comprising:
an underbody aerodynamic diffuser including an aerodynamic surface, facing, in use, towards a ground surface, and an opening made through the aerodynamic surface, the diffuser configured to take in through the opening a first portion of a first air inflow received by an air inlet of the motorcar and produced by a forward motion of the motorcar travelling on the ground surface, so that the first portion taken in by the diffuser becomes at least a portion of an internal flow inside the diffuser,
the aerodynamic surface, in conjunction with the ground surface, defining, during the forward motion, a diffusion duct in which the internal flow flows,
an aerodynamic element movable between a first position and a second position relative to the diffuser;
a movement system for moving the aerodynamic element;
wherein the movement system is configured to keep the aerodynamic element operatively at least at the first position and at the second position relative to the diffuser and to cause the element to move between the first position and the second position;
wherein, at the first position, the aerodynamic element is immersed in the internal flow and allows the internal flow to follow an aerodynamic profile of the aerodynamic surface to generate a first aerodynamic load acting on the motorcar during the forward motion;
wherein, at the second position, the aerodynamic element acts at least partly as a barrier against the internal flow, moving the internal flow away from the aerodynamic surface to generate a second aerodynamic load acting on the motorcar during the forward motion, wherein the second aerodynamic load is smaller than the first aerodynamic load.

2. The adjustment device according to claim 1, wherein:
when the aerodynamic element adopts the first position, the aerodynamic element exerts on the diffusion duct an occluding effect that is smaller than when the aerodynamic element adopts the second position, so that a diffusing effect that the diffuser exerts on the internal flow by the aerodynamic surface is greater at the first position than at the second position and the first aerodynamic load is greater than the second aerodynamic load; and
at both the first position and the second position, the aerodynamic element is located downstream of the opening along the diffusion duct and in a direction of the internal flow.

3. The adjustment device according to claim 1, wherein:
the aerodynamic element has a first external surface and a second external surface, opposite to the first external surface, each of the first external surface and the second external surface extending from a leading edge to a trailing edge of the aerodynamic element;
at the first position, the aerodynamic element causes the internal flow to follow the aerodynamic profile of the aerodynamic surface of the diffuser both by contact of the internal flow with the first external surface and by contact of the internal flow with the second external surface.

4. The adjustment device according to claim 3, wherein the aerodynamic element is shaped as a wing, with the first external surface being a back side of the wing and the second external surface being an underside of the wing.

5. The adjustment device according to claim 1, wherein the movement system comprises:
a shaft on which the aerodynamic element is mounted, so that the aerodynamic element rotates as one with the shaft about an axis of the shaft;
an actuator acting on the shaft to cause the rotation, so that the movement of the aerodynamic element is a rotational movement about the axis, the first position and the second position differing from each other in an orientation of the aerodynamic element about the axis.

6. The adjustment device according to claim 5, wherein the shaft is situated between the leading edge and the trailing edge of the aerodynamic element and is positioned along the diffusion duct and in a direction of the internal flow, downstream of the opening.

7. The adjustment device according to claim 6, wherein:
the diffuser comprises two lateral surfaces which extend transversely to the aerodynamic surface to delimit sides of the diffusion duct, the shaft being supported by the lateral surfaces:
the aerodynamic surface delimits a top of the diffusion duct;
the shaft is positioned inside the diffusion duct so that the aerodynamic element, at both the first position and the second position, is situated inside the diffusion duct, downstream of the opening along the diffusion duct and in the direction of the internal flow.

8. The adjustment device according to claim 1, and further comprising a structure which defines the aerodynamic surface, the structure being able to be built into or mounted on an underbody of the motorcar so that the aerodynamic surface defines a portion of an external underbody surface of the motorcar.

9. The adjustment device according to claim 1, and further comprising the air inlet.

10. The adjustment device according to claim 1, wherein the movement system is configured to keep the aerodynamic element operatively at least at a third position relative to the diffuser and to cause the aerodynamic element to move between the first position or the second position and the third position, the third position being intermediate between the first position and the second position.

11. A motorcar comprising the adjustment device according to claim 1, wherein the aerodynamic surface of the diffuser defines a portion of an external underbody surface of the motorcar.

12. The motorcar according to claim 11, comprising the air inlet and a radiator interposed between the air inlet and the opening, so that the first portion taken in flows through the radiator, the first portion taken in when the aerodynamic element is at the second position being smaller than the first portion taken in when the aerodynamic element is at the first position, a reduction in the first portion taken in being defined with a passage of the aerodynamic element from the first position to the second position, the reduction in the first portion taken in resulting in a reduction in a flow rate of the first air inflow through the radiator to reduce a drag of the motorcar.

13. The motorcar according to claim 11, wherein the adjustment device is situated in front of a front wheel of the motorcar.

\* \* \* \* \*